United States Patent
Zhang

(10) Patent No.: US 8,467,425 B1
(45) Date of Patent: Jun. 18, 2013

(54) METHOD FOR GENERATING HIGH-ENERGY AND HIGH REPETITION RATE LASER PULSES FROM CW AMPLIFIERS

(75) Inventor: Shukui Zhang, Yorktown, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 0 days.

(21) Appl. No.: 13/373,716

(22) Filed: Nov. 28, 2011

Related U.S. Application Data

(60) Provisional application No. 61/463,783, filed on Feb. 22, 2011.

(51) Int. Cl.
*H01S 3/10* (2006.01)

(52) U.S. Cl.
USPC .................................. 372/25; 372/12; 372/13

(58) Field of Classification Search
USPC ................................. 372/25, 12, 13
See application file for complete search history.

(56) References Cited

U.S. PATENT DOCUMENTS

| 8,199,398 B2 * | 6/2012 | Fermann et al. | 359/341.1 |
| 2009/0201954 A1 * | 8/2009 | Alekel et al. | 372/6 |
| 2011/0267671 A1 * | 11/2011 | Peng et al. | 359/257 |

* cited by examiner

*Primary Examiner* — Kinam Park

(57) ABSTRACT

A method for obtaining high-energy, high repetition rate laser pulses simultaneously using continuous wave (CW) amplifiers is described. The method provides for generating micro-joule level energy in pico-second laser pulses at Mega-hertz repetition rates.

8 Claims, 2 Drawing Sheets

METHOD FOR GENERATING HIGH-ENERGY AND HIGH REPETITION RATE LASER PULSES FROM CW AMPLIFIERS

This application claims the benefit of U.S. Provisional Application No. 61/463,783 filed on Feb. 22, 2011 for A Method for Generating High-Energy and High Repetition Rate Laser Pulses From CW Amplifiers incorporated by reference herein in its entirety.

The United States government may have certain rights to this invention under Management and Operating Contract No. DE-AC05-06OR23177 from the Department of Energy.

FIELD OF THE INVENTION

The invention relates generally to a method and apparatus for obtaining high pulse energy and high repetition rate from a pulsed laser.

BACKGROUND

Recent developments with photo-cathode-based accelerators and light sources such as free electron lasers and x-ray laser machines have demonstrated the usefulness and desirability of lasers with extremely short pulses. With the rapid progress in the performance of the existing machines and many proposed facilities, the technical requirements for conventional lasers such as drive lasers, X-ray seed lasers and diagnostic lasers have reached a new level. However, the pulsed laser systems currently used in the art typically fall into one of two groups either high energy and relatively low repetition rate or relatively low energy and high repetition rate. Ti:sapphire lasers are exemplary of the former having a femto-second pulse width, milli-joule energy output pulse energy and kilo-hertz (kHz) repetition rate. Typically conventional lasers having repetition rates of mega-hertz (MHz) to giga-Hertz (GHz) have pulse energies on the level of nano-joules (nJ). Major obstacles have been encountered in attempting to achieve mega-hertz repetition rates on milli-joule energy output lasers such as Ti:sapphire lasers or micro-joule to milli-joule pulse energy outputs on a mega-hertz repetition rate laser system.

Additionally, for single oscillator lasers known in the art changing repetition rate is very difficult at best. In the prior art, the traditional master-oscillator-power amplifier mode (MOPA) configuration is most typically used. In the MOPA mode, the repetition rate is set by the oscillator. In the traditional system the output pulse energy is limited with a CW amplifier as the maximum stored energy in the CW amplifier is limited for efficient extraction and the amplified energy in each pulse is dependent on the pulse repetition rate with higher repetition rates typically yielding lower pulse energies.

Accordingly, there is a need for a practical way to achieve high pulse energy and high repetition rate in a pulsed laser system simultaneously.

SUMMARY OF INVENTION

In one embodiment the invention provides a method for generating high-energy, high repetition rate laser pulses using a continuous wave amplifier. The method comprises providing a commercial oscillator producing a pulsed laser beam, the beam has a beam path and an initial beam pulse energy. The method further comprises providing a first continuous wave amplifier and an electro-optical modulator in the beam path, wherein the electro-optical modulator is between the oscillator and the first continuous wave amplifier and providing a phase-locking system that synchronizes the initial pulsed laser beam with the electro-optical modulator. The pulsed laser beam is passed along the beam path through the electro-optical modulator and first amplifier and the beam is amplified to produce a pulsed output laser beam with amplified output beam pulse energy. In one embodiment at least one second continuous wave amplifier is provided after the first amplifier to provide at least one second stage of amplification of the pulsed laser beam.

In one exemplary embodiment the output beam pulse energy is at least 100 fold greater than the initial beam pulse energy. In another exemplary embodiment the output beam pulse energy is at least 1000 fold greater than the initial beam pulse energy.

In one exemplary embodiment the pulsed output laser beam has a repetition rate of at least one mega-hertz and alternatively at least 2 mega-hertz.

The invention also provides a laser system configuration for generating high-energy, high repetition rate laser pulses using a continuous wave amplifier. In one embodiment the laser system comprises an oscillator having a pulsed laser beam wherein the pulsed laser beam has a beam path and an initial beam pulse energy; a first continuous wave amplifier and an electro-optical modulator wherein the first continuous wave amplifier and electro-optical modulator are in the beam path and the electro-optical modulator is between the oscillator and the first continuous wave amplifier; and a phase-locking system wherein the phase-locking system synchronizes the pulsed laser beam with the electro-optical modulator. The pulsed laser beam passes along the beam path through the electro-optical modulator and first continuous wave amplifier. Preferably the system also comprises at least one second continuous wave amplifier.

DETAILED DESCRIPTION OF THE INVENTION

The apparatus and method described herein utilizes one or more continuous wave (CW) amplifiers with an oscillator to obtain a pulsed laser beam with both a high output beam pulse energy (micro-joule or greater) and high repetition rate (a rate at least in the mega-hertz range) simultaneously. The system comprises an oscillator, electro-optical modulator, and at least one continuous wave amplifier with the electro-optical modulator positioned in the beam between the oscillator and the first continuous wave amplifier.

As used herein an oscillator is any laser in which the output beam takes the form of pulses of light at a predetermined repetition rate. Seed lasers are oscillators, for example. A mode locked oscillator is a laser that creates very short pulses at a pre-determined repetition rate.

As used herein a continuous wave amplifier (i.e. CW amplifier) is designed for use with a continuous wave laser, i.e. a laser that produces a continuously output beam. Amplifiers that are used with CW lasers have been deemed in the prior art to be unsuitable for amplification of pulsed lasers due to low amplification gain.

As used herein an electro-optical modulator (EOM) is an optical device that serves as a pulse repetition selection device; i.e. it is a switch that operates to change the pulse repetition rate. A Pockels cell is exemplary of an EOM.

As used herein a polarizer is a device that passes light of a specific polarization and rejects light of other polarizations.

Figure 1:
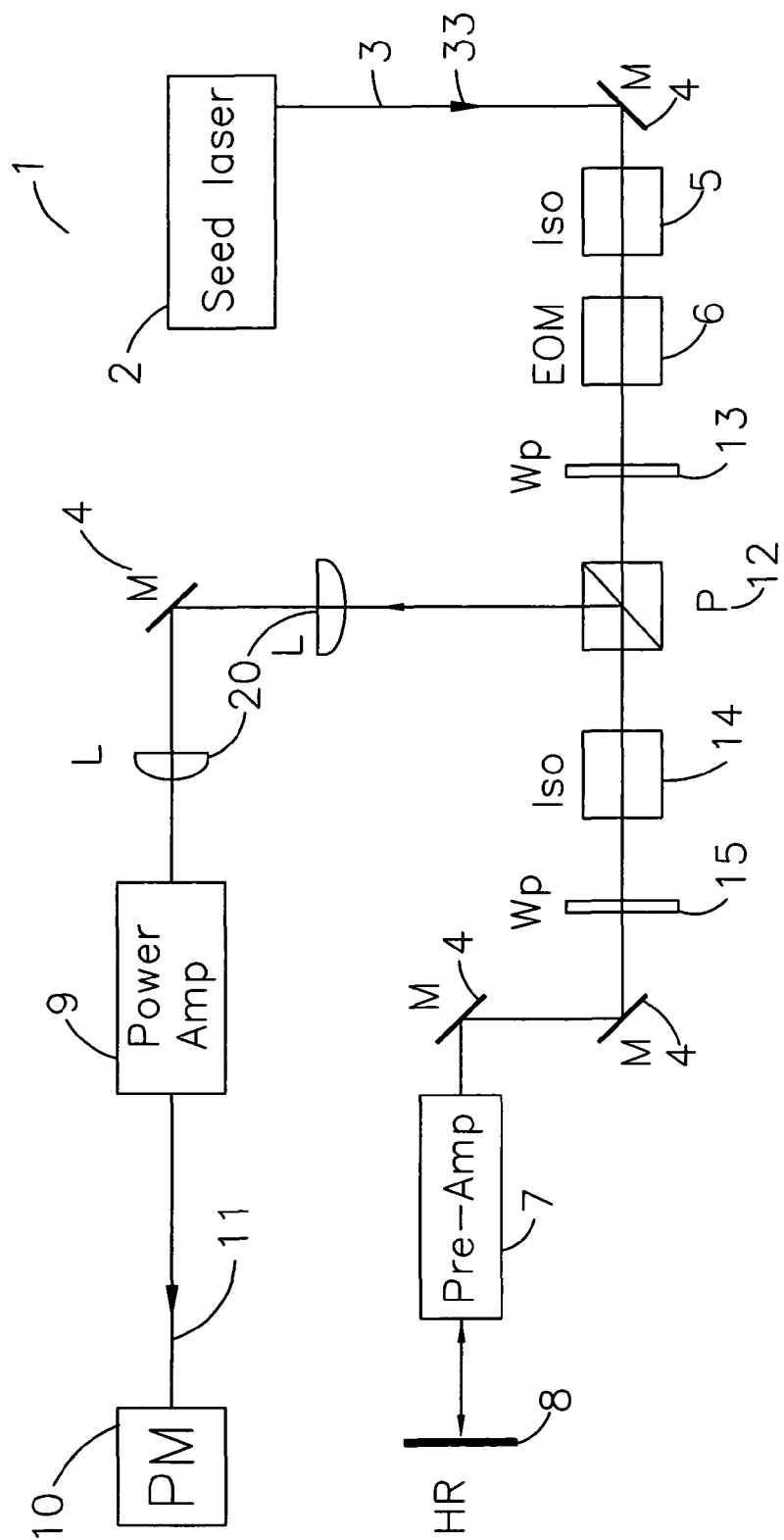
FIG. 1 is a schematic representation of one embodiment of the pulsed laser system of the invention.

FIG. 1 is a schematic representation of an exemplary embodiment of laser system 1 of the invention. The laser system comprises an oscillator 2. Any high repetition rate, mode-locked laser may be used as the oscillator in the practice of the invention. In fact, the invention is particularly well suited for use with a conventional or commercial oscillator and provides for obtaining a high output pulse energy from a conventional oscillator. In one exemplary embodiment a diode pumped Nd:YVO$_4$ laser was used as the oscillator. Other lasers, which may likewise be suitable oscillators, include, but are not limited to, diode lasers or fiber lasers.

The oscillator 2 produces a laser beam 3 which has an initial beam pulse energy and follows a beam path 33. The initial laser beam 3 is directed through the system 1 along the beam path 33 by a plurality of mirrors 4. Typically, the oscillator 2 will produce a pulsed beam with a pulse energy of a few nano-joules. In representative embodiments, the initial beam pulse energy is less than 10 nano-joules, or alternatively less than 7 nano-joules, or alternatively less than 5 nano-joules or alternatively less than 3 nano-joules.

The laser beam 3 having the initial beam pulse energy passes through an optical isolator 5 and into an electro-optical modulator (EOM) 6. The EOM 6 is placed in the beam path 33 between the oscillator 2 and first amplifier 7. The EOM 6 serves as a pulse frequency down converter to reduce the laser pulse repetition rate to a lower repetition rate. A phase-locking system may be used to synchronize the laser beam 3 and EOM 6 driver and keep the laser beam 3 and EOM 6 in phase. A Pockels cell may be used as an electro-optical modulator 6, for example The initial laser beam 3 passes from the EOM 6 through a series of optics to a first amplifier 7. The first amplifier 7 may also be referred to as a "preamplifier" in embodiments using a plurality of amplifiers. In the embodiment shown in FIG. 1 the beam 3 passes through optics elements including two wave plates 13, 15, polarizer 12 and a second optical isolator 14 and is reoriented in direction by two mirrors 4 as it passes from the EOM 6 to the first amplifier 7. This optical arrangement between the EOM 6 and first amplifier 7 is exemplary of a suitable optical arrangement, however, as one skilled in the art appreciates, other optical arrangements and/or optical components may be likewise suitable for use in the practice of the invention.

In the embodiment shown in FIG. 1, upon passing through the first amplifier 7, the beam 3 strikes a high reflector 8 and is redirected through the first amplifier 7 for further amplification. The high reflector 8 is highly efficient in reflecting the beam 3. Upon further amplification, the beam 3 is directed through a series of optics to a second amplifier 9. The second amplifier 9 may also be referred to as a "power amp" in embodiments using a plurality of amplifiers. As shown in FIG. 1, the beam 3 is directed from the first amplifier 7 to the second amplifier by a plurality of mirrors 4 and passes through waveplate 15, optical isolator 14, polarizer 12 and lenses 20. The use of the polarizer 12 facilitates utilization of the first amplifier 7 for two stages of amplification. This optical arrangement between the first amplifier 7 and second amplifier 9 is exemplary of a suitable optical arrangement; however, as one skilled in the art appreciates, other optical arrangements and/or optical components may be likewise suitable for use in the practice of the invention.

Upon exiting the second amplifier 9, the pulsed output laser beam 11 has a output pulse energy at least an order of magnitude greater than the initial beam pulse energy of laser beam 3 and in some embodiments two, three or more orders of magnitude greater. For example, for an initial beam pulse energy of less than 10 nano-joules, the pulse energy of the output laser beam is typically at least 1 micro-joule. In one exemplary embodiment using two CW amplifiers, an output laser beam having micro-joule energy, pico-second pulses at mega-hertz repetition rates was achieved from an initial pulsed laser beam with an energy of about 5 nano-joules. Optionally, a power meter 10 can measure the power of the output beam 11.

The exemplary embodiment of FIG. 1 uses two amplifiers with three stages of amplification. Preferably at least two stages of amplification are used and more preferably it is desirable to use 3 or more stages of amplification. The number of amplifiers used depends upon the intended use for the system with more amplifiers being used for higher output beam pulse energies; i.e. 3, 4, or more amplifiers may be used to achieve higher amplification. The plurality of stages of amplification may be accomplished using a plurality of amplifiers, by redirecting the laser beam through one or more of the amplifiers a second time and/or a combination thereof. Preferably, all of the amplifiers are CW amplifiers for mega hertz repetition rates. Conventional CW amplifiers including commercially available CW amplifiers may be use in the practice of the invention. For one exemplary embodiment having a diode pumped Nd:YVO$_4$ laser, the laser media inside the amplifier was Nd:YVO$_4$ side-pumped by laser diodes. Other exemplary CW amplifiers included, but are not limited to, Yb-glass and YLF at wavelengths matched to that of the oscillators, for example.

Preferably the all of the amplifiers are positioned in the optical path such that the laser beam passes through the EOM prior to passing through any of the amplifiers; i.e. the laser beam passes through the EOM before reaching the first amplifier and any other amplifiers are positioned such that the beam passes through the first amplifier before passing through to other amplifiers.

The inventor believes without wishing to be held to the theory that the use of an electro-optic modulator in the beam path between the oscillator and the first CW amplifier is the key component for achieving both high pulse rate and high repetition rate. Further by using a configuration in which the EOM is positioned between the laser oscillator and first amplifier, optical damage to the EOM can be minimized as the laser beam has low power as it passes through the EOM. The low laser power beam also comes with the great advantage that smaller EOM aperture or lower driving voltage is required.

Optionally, a second harmonic generator (not shown) may be included in the laser system 1 shown in FIG. 1 after the second amplifier 9 and is highly desirable for some applications, such as for example, applications related to photocathode based equipment that need shorter wavelength laser beams.

A method for obtaining both high pulse energy and high repetition rate simultaneously using conventional continuous wave amplifiers is provided. The method may be used with conventional and/or commercial oscillators. The method comprises providing a pulsed laser beam having a beam path. A first CW amplifier and an electro-optical modulator are placed in the beam path with the electro-optical modulator being between the laser and the first CW amplifier. A phase-locking system synchronizes the pulsed laser beam with the electro-optical modulator.

Preferably, the method includes the use of a plurality of stages of additional amplification after the beam passes through the first CW amplifier. This may be accomplished by passing the beam through at least one second CW amplifier after passing the beam through the first CW amplifier and/or by using a high reflectance reflector and passing the beam through at least one CW amplifier a second time for a second stage of amplification. Alternatively, a combination of CW and other types of amplifiers may be used. However, at least one CW amplifier should be used and preferably all amplifiers are CW amplifiers.

In one exemplary embodiment, a commercial diode pumped Nd:YVO$_4$ mode-locked laser was used as the oscillator with a first and a second CW amplifier. The laser media inside the amplifiers was Nd:YVO$_4$ side-pumped by laser diodes. The beam was passed through the first amplifier twice before passing to the second amplifier for two stages of amplification. In this exemplary embodiment an initial beam energy of about 5 nano-joules was amplified to an output beam energy of micro-joules at a repetition rate of mega-hertz.

Thus, the method provides at least a hundred fold or two orders of magnitude increase in pulse energy between the initial beam pulse energy and the output beam pulse energy at multi-mega-hertz repetition rates. In another embodiment at least a thousand fold or three orders of magnitude or more increase in energy between the initial beam pulse energy and the output beam pulse energy at mega-hertz repetition rates may be obtained. Pulsed laser (PW) amplifiers known in the art prior to the present invention do not provide for such amplification and energies simultaneously at variable repetition rates over mega-hertz. For higher output beam energy using the present method, additional amplifiers may be added to the laser system. As one skilled in the art will appreciate, the addition of additional amplifiers will also require the addition of corresponding optical elements such as, for example, mirrors to direct the beam and/or lenses.

Accordingly, the method of the invention provides a practical approach for overcoming the known difficulty in obtaining laser systems having both output pulses with MHz or higher repetition rates and high pulse energy simultaneously. Such systems are desirable for many applications in scientific research. In addition to many applications in scientific research, high energy (micro-J) and high repetition rate (mega-hertz) pico-second lasers have unique capability that opens the way to new solutions in industrial applications such as precision micromachining, materials processing, flat panel display, advanced packaging, interconnects, semiconductor and solar manufacturing.

EXAMPLE 1

The following example is provided for illustrative purposes. In the exemplary embodiment of Example 1, the oscillator was a mode-locked Nd:YVO$_4$ seed laser. The seed laser had 20 pico-second pulse width, 500 mW output power, 1064 nm wavelength and 74.85 MHz repetition rate. Two identical continuous wave amplifiers with the beam being reflected to make two passes through the first amplifier were used. The seed laser generated an initial laser beam having about 5 nano-joule pulse energy and a repetition rate of 74.85 MHz.

Figure 2:
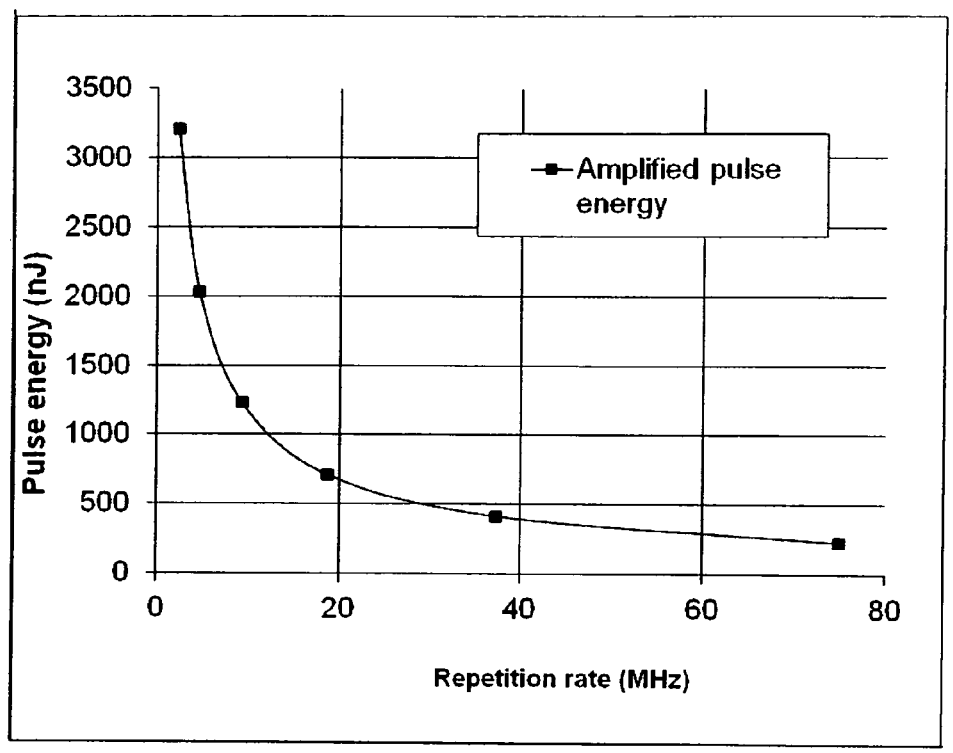
FIG. 2 is a graph of amplified pulse energy versus repetition rate for an exemplary embodiment of the invention.

FIG. 2 provides data showing the amplification of the laser system of Example 1. As shown in FIG. 2 the initial beam pulse energy of about 5 nano-joules of the seed laser was increased to 240 nJ at 74.85 MHz and it continues to increase as the repetition rate decreases. However, FIG. 2 also shows that while retaining a repetition rate in the MHz range of 2.34 MHz an output beam pulse energy of 3 micro-joules was obtained. This is an amplification of about 1000 fold and is sufficient energy for producing nano-coulomb high energy electron bunches even with a 1% quantum efficiency photocathode for accelerators.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. A method for generating high-energy, high repetition rate laser pulses using a continuous wave amplifier, the method comprising:
   a. providing an oscillator producing an initial pulsed laser beam, the beam having a beam path and an initial beam pulse energy;
   b. providing sequentially along said beam path a first optical isolator, an electro-optical modulator, a first wave plate, a polarizer, a second optical isolator, a second wave plate, two mirrors, a first continuous wave amplifier, and a high reflector;
   c. providing a phase-locking system that synchronizes the initial pulsed laser beam with the electro-optical modulator;
   d. passing the pulsed laser beam along the beam path through the electro-optical modulator and through said first continuous wave amplifier thereby amplifying the pulsed laser beam a first time; and
   e. reflecting said pulsed laser beam with said high reflector thereby passing said pulsed laser beam in an opposite direction along said beam path whereby said laser beam passes through said first continuous wave amplifier a second time to produce a pulsed laser beam having a higher pulse energy than said initial pulsed laser beam.

2. The method of claim 1, further including
   rotating the polarization of said pulsed laser beam with said second wave plate and said second optical isolator;
   diverting the direction of said pulsed laser beam with said polarizer to provide a second beam path; and
   providing at least one second continuous wave amplifier in said second beam path wherein the at least one second continuous wave amplifier provides at least one second stage of amplification of said pulsed laser beam to further increase the laser pulse energy and beam power.

3. The method of claim 2, wherein the output beam pulse energy is at least 100 fold greater than the initial beam pulse energy.

4. The method of claim 2, wherein the output beam pulse energy is at least 1000 fold greater than the initial beam pulse energy.

5. The method of claim 3, wherein the initial beam pulse energy is less than 10 nano joules and the energy of the output pulsed laser beam is at least 3 micro-joule.

6. The method of claim 1, in which the output pulsed laser beam has a repetition rate of at least one mega-hertz.

7. The method of claim 1, in which the output pulsed laser beam has a repetition rate of at least two mega-hertz.

8. The method of claim 1, wherein the oscillator is a diode pumped Nd:YVO4 laser and said first continuous wave amplifier comprises Nd:YVO4 side-pumped by laser diodes.

* * * * *